United States Patent
Sun et al.

(10) Patent No.: US 11,309,768 B2
(45) Date of Patent: Apr. 19, 2022

(54) MOTOR AND MOTOR FIXING STRUCTURE

(71) Applicant: AUTEL ROBOTICS CO., LTD., Guangdong (CN)

(72) Inventors: Wei Sun, Guangdong (CN); Dongdong Luo, Guangdong (CN); Wenbing Su, Guangdong (CN); Yidong Chen, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 263 days.

(21) Appl. No.: 16/567,188

(22) Filed: Sep. 11, 2019

(65) Prior Publication Data

US 2020/0007001 A1 Jan. 2, 2020

Related U.S. Application Data

(63) Continuation of application No. PCT/CN2017/113793, filed on Nov. 30, 2017.

(51) Int. Cl.
*H02K 5/22* (2006.01)
*B64C 27/00* (2006.01)

(52) U.S. Cl.
CPC .............. *H02K 5/225* (2013.01); *B64C 27/00* (2013.01)

(58) Field of Classification Search
CPC ........ A63H 27/00; A63H 27/12; B64C 27/08; B64C 27/14; B64C 39/024; B64C 2203/00; B64C 2201/024; B64C 2201/027; B64C 2201/042; B64C 2201/108; B64C 2201/12; B64C 2201/146; B64C 2201/165
See application file for complete search history.

(56) References Cited

U.S. PATENT DOCUMENTS

| | | | |
|---|---|---|---|
| 9,975,644 B1* | 5/2018 | Kimchi | .................. B64C 39/024 |
| 2013/0287577 A1* | 10/2013 | Lin | .......................... B64C 11/04 |
| | | | 416/210 R |
| 2015/0314207 A1 | 11/2015 | Chen | |
| 2016/0137306 A1* | 5/2016 | Ji | .......................... H01R 13/627 |
| | | | 244/54 |

FOREIGN PATENT DOCUMENTS

| | | |
|---|---|---|
| CN | 204998764 U | 1/2016 |
| CN | 205145599 U | 4/2016 |
| CN | 205381397 U | 7/2016 |
| CN | 106218882 A | 12/2016 |
| CN | 206640446 U | 11/2017 |

OTHER PUBLICATIONS

International Search Report and Written Opinion dated Mar. 7, 2018; PCT/CN2017/113793.

* cited by examiner

*Primary Examiner* — Bryan R Perez

(57) ABSTRACT

The present disclosure provides a motor and a motor fixing structure. A first conductive terminal is disposed on the motor, a lead of the motor being electrically connected to an external device through the first conductive terminal, thereby simplifying a manner of connection. When the motor fails, it is only necessary to disconnect the electrical connection between the first conductive terminal and the external device, so that the motor can be rapidly detached without any auxiliary tool, thereby simplifying operations of detaching and mounting a motor and improving the efficiency of replacing a motor.

7 Claims, 3 Drawing Sheets

MOTOR AND MOTOR FIXING STRUCTURE

CROSS-REFERENCE TO RELATED APPLICATIONS

This application is a continuation of International Application No. PCT/CN2017/113793, filed on Nov. 30, 2017, which claims priority to Chinese Patent Application No. 201720182246.4, filed with the China National Intellectual Property Administration on Feb. 27, 2017 and entitled "MOTOR AND MOTOR FIXING STRUCTURE", both of which are incorporated herein by reference in their entireties.

BACKGROUND

Technical Field

The present application relates to the aircraft field, and in particular, to a motor and a motor fixing structure.

Related Art

A multirotor, also referred to as a rotorcraft, is provided with a plurality of propellers. A plurality of motors control the plurality of propellers to implement flight. Multirotors are widely applied to aerial photography, detection, search and rescue, resource exploration, agriculture, among other fields, and have the advantages such as small volumes, light weights, low costs, flexible operations and high safety. A multirotor has a plurality of arms. Motors that provide power to propellers are usually mounted on the arms through a motor mount. An electronic speed control (ESC) configured to control the motors is mounted in the fuselage of the aircraft.

In a multirotor in the prior art, a motor mount of the multirotor is fixedly mounted on an arm through a plurality of screws. A motor lead is passed inside the arm and is soldered on an ESC in the arm. The ESC is electrically connected to a flight control on the fuselage of the multirotor to implement control of a motor by the flight control. When a motor fails and needs to be replaced or detached for repair, because the motor lead is passed inside the arm and is soldered to the ESC, it is very inconvenient to detach and mount the motor. In view of the above, how to rapidly detach and mount a motor of a multirotor is an urgent problem to be resolved.

SUMMARY

Therefore, the technical problem to be resolved in the present application is to overcome the technical disadvantage of complex operations of detaching and mounting a motor of a multirotor in the prior art.

Therefore, the present application provides a motor, where a first conductive terminal is disposed on the motor, a lead of the motor being electrically connected to an external device through the first conductive terminal.

According to an embodiment of the present application, the motor is provided with a protruding insertion portion, the first conductive terminal being disposed on the insertion portion.

According to an embodiment of the present application, the motor includes a motor mount and a motor body connected to the motor mount, the insertion portion being disposed on the motor mount.

According to an embodiment of the present application, the motor further includes a connecting member, the motor mount being provided with a through hole penetrating the motor mount, and the motor being connected to the external device through the connecting member passed through the through hole.

According to an embodiment of the present application, the first conductive terminal is a conductive contact, a conductive pin or a conductive socket.

Another technical solution adopted by the present application to resolve the technical problem is as follows: A motor fixing structure is constructed, where the motor fixing structure includes an aircraft arm and a motor detachably connected to the aircraft arm, the motor being provided with a first conductive terminal electrically connected to a lead of the motor, the aircraft arm being provided with a second conductive terminal electrically connected to a control unit of an aircraft, and the first conductive terminal being electrically connected to the second conductive terminal.

According to an embodiment of the present application, the motor is provided with a protruding insertion portion, the first conductive terminal being disposed on the insertion portion, the aircraft arm being provided with an insertion slot configured to accommodate the insertion portion, and the second conductive terminal being disposed inside the insertion slot.

According to an embodiment of the present application, the motor includes a motor mount and a motor body connected to the motor mount, the insertion portion being disposed on the motor mount.

According to an embodiment of the present application, the motor fixing structure further includes a connecting member configured to detachably connect the motor to the aircraft arm, the motor mount being provided with a through hole penetrating the motor mount, the aircraft being provided with a mounting hole, the connecting member being passed through the through hole and the mounting hole, and the motor being detachably connected to the aircraft arm through the connecting member.

According to an embodiment of the present application, the connecting member is a screw or a positioning pin.

According to an embodiment of the present application, both the first conductive terminal and the second conductive terminal are conductive contacts; or the first conductive terminal is a conductive pin, and the second conductive terminal is a conductive socket; or the first conductive terminal is a conductive socket, and the second conductive terminal is a conductive pin.

The motor and the aircraft provided in the present application have the following advantages:

The first conductive terminal electrically connected to the lead of the motor and the second conductive terminal electrically connected to the control unit of the aircraft are respectively disposed on the motor and the aircraft aim, so that the motor can be electrically connected to the control unit inside the aircraft through the first conductive terminal, thereby simplifying a manner of connection. When the motor fails, it is only necessary to disconnect the electrical connection between the first conductive terminal and the second conductive terminal, so that the motor can be rapidly detached without any auxiliary tool, thereby simplifying operations of detaching and mounting a motor and improving the efficiency of replacing a motor.

BRIEF DESCRIPTION OF THE DRAWINGS

To describe the technical solutions in the specific implementations of the present application more clearly, the present application is further described below in detail with reference to the accompanying drawings and the specific embodiments of the present application.

Figure 1:
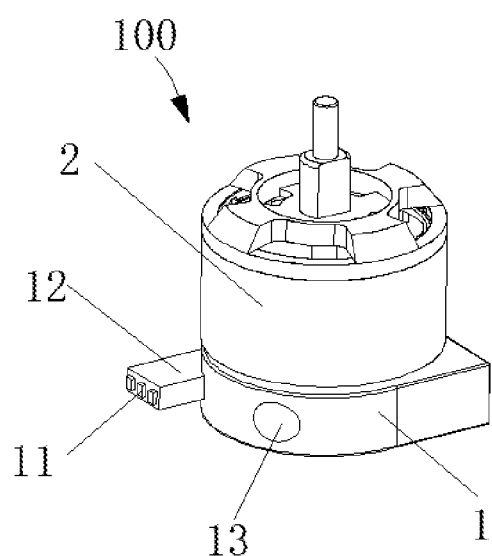
FIG. 1 is a schematic structural view of a motor according to an embodiment of the present application.

Reference numerals in the accompanying drawings are as follows.

100—motor; 1—motor mount; 11—first conductive terminal; 12—insertion portion; 13—through hole; 2—motor body; 3—connecting member; 200—aircraft arm; 201—second conductive terminal; 202—insertion slot; and 203—mounting hole.

DETAILED DESCRIPTION

The following clearly and completely describes the technical solutions in the present application with reference to the accompanying drawings. Apparently, the described embodiments are some rather than all of the embodiments of the present application. All other embodiments obtained by a person of ordinary skill in the art based on the embodiments of the present application without creative efforts shall fall within the protection scope of the present application.

In the description of the present application, it should be noted that orientation or position relationships indicated by the terms such as "on", "inside" and "outside" are based on orientation or position relationships shown in the accompanying drawings, and are used only for ease and brevity of illustration and description, rather than to indicate or imply that the mentioned apparatus or component must have a particular orientation or must be constructed and operated in a particular orientation. Therefore, such terms should not be construed as limiting of the present application. In addition, the terms such as "first" and "second" are used only for the purpose of description, and should not be understood as indicating or implying the relative importance.

In the description of the present application, it should be noted that unless otherwise explicitly specified or defined, the term "connect" and "connection" should be understood in a broad sense. For example, the connection may be a fixed connection or a detachable connection; or the connection may be a mechanical connection or an electrical connection. A person of ordinary skill in the art may understand the specific meanings of the foregoing terms in the present application according to specific cases.

In addition, the related technical features in the different implementations of the present application can be combined as long as no conflict occurs.

A motor and a motor fixing structure provided in the embodiments of the present application may be applied to various motor-driven movable objects, including but not limited to, an unmanned aerial vehicle (UAV), a ship and a robot. The UAV is used as an example for description. A structure of the UAV includes a central housing, an arm and a power system. The arm is integrally or fixedly connected to the central housing, and the power system is mounted on the arm. A typical power system includes an ESC, a motor and a propeller. To be specific, the motor is mounted on the arm, a rotating shaft of the motor being connected to the propeller. The propeller is driven by the motor to generate a force that enables the UAV to move, for example, lift or thrust that enables the UAV to move.

In the embodiments of the present application, the motor is detachably mounted on the arm of the UAV. The motor and the aircraft arm form the motor fixing structure together. The motor and the motor fixing structure provided in the embodiments of the present application are described below in detail with reference to the accompanying drawings.

FIG. 1 is a schematic structural view of a motor 100 according to an embodiment of the present application. The motor 100 includes a motor mount 1 and a motor body 2 that is disposed on the motor mount 1 and is detachably connected to the motor mount 1. It can be understood that the motor mount 1 and the motor body 2 may be integrally formed. The motor mount 1 is provided with a protruding insertion portion 12 and a through hole 13 penetrating the motor mount 1. A first conductive terminal 11 is disposed on the insertion portion 12. A lead of the motor body 2 is electrically connected to an external device through the first conductive terminal 11. When the motor mount 1 and the motor body 2 are integrally formed, the first conductive terminal 11 can be disposed in any appropriate position.

In the motor 100, the first conductive terminal 11 electrically connected to the lead of the motor body 2 is disposed on the motor mount 1, so that the motor 100 can be electrically connected to the external device through the first conductive terminal 11, thereby simplifying a manner of connection. When the motor 100 fails, it is only necessary to disconnect the electrical connection between the first conductive terminal 11 and the external device, so that the motor 100 can be rapidly detached without any auxiliary tool, thereby simplifying operations of detaching and mounting a motor and improving the efficiency of replacing a motor.

Figure 2:
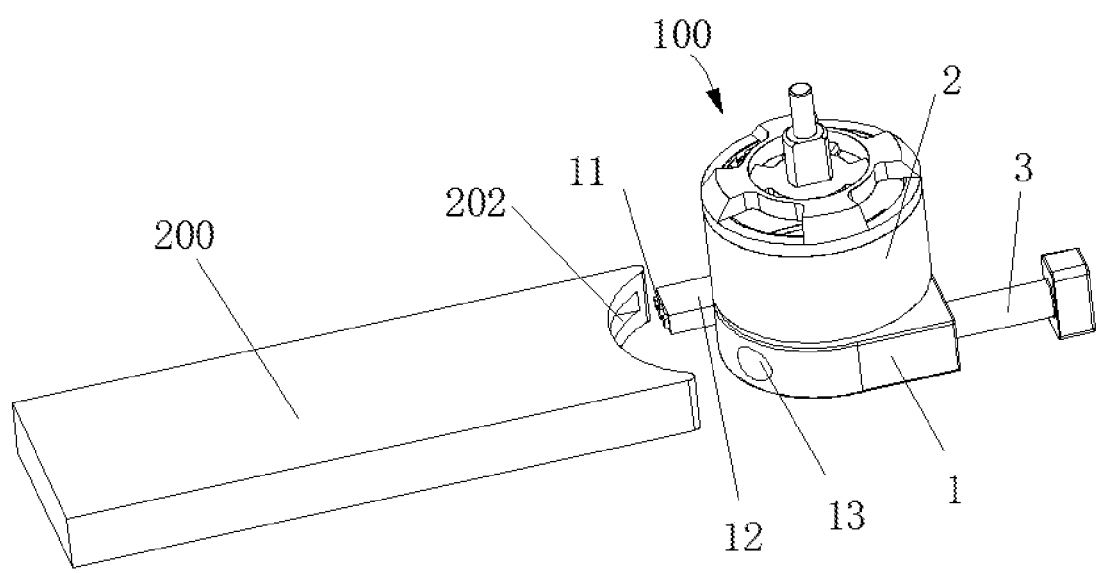
FIG. 2 is a structural exploded view of a motor fixing structure according to an embodiment of the present application.

FIG. 2 is a structural exploded view of a motor fixing structure according to an embodiment of the present application. The motor fixing structure is suitable to be mounted on various motor-driven movable objects to provide power to the movable objects. In this embodiment, the motor fixing structure is applied to a UAV, which includes an aircraft arm 200 and a motor 100 detachably connected to the aircraft arm 200. The motor 100 includes a motor mount 1 and a motor body 2 that is disposed on the motor mount 1 and is detachably connected to the motor mount 1. It can be understood that the motor mount 1 and the motor body 2 may be integrally formed. The motor mount 1 is provided with a protruding insertion portion 12 and a through hole 13 penetrating the motor mount 1. The insertion portion 12 is provided with a first conductive terminal 11 electrically connected to a lead of the motor body 2.

Figure 3:
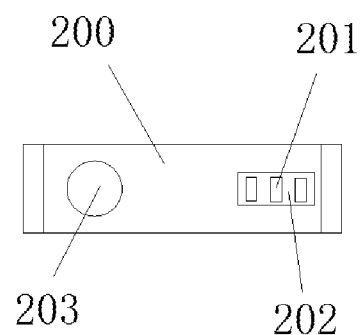
FIG. 3 is a front view of an aircraft arm in the motor fixing structure shown in FIG. 2.

As shown in FIG. 3, the aircraft arm 200 is provided with a mounting hole 203 and an insertion slot 202 configured to accommodate the insertion portion 12. A second conductive terminal 201 electrically connected to a control unit of an aircraft is disposed inside the insertion slot 202. When the motor 100 is mounted on the aircraft aim 200, the insertion portion 12 is inserted into the insertion slot 202 to implement electrical contact between the first conductive terminal 11 and the second conductive terminal 201, so that the motor 100 is electrically connected to the control unit inside the aircraft. The insertion portion 12 is disposed on the motor mount 1. The aircraft arm 200 is correspondingly provided with the insertion slot 202. In this way, the positioning is more accurate in the process of detaching and mounting a motor. Herein, the control unit may be an ESC and/or a flight control.

In view of the above, instead of being passed through the aircraft arm 200 to be electrically connected to the control unit, the lead of the motor 100 is electrically connected to the control unit through the first conductive terminal 11 and the second conductive terminal 201. When the motor 100 fails, it is only necessary to disconnect the electrical connection between the first conductive terminal 11 and the second conductive terminal 201. Therefore, with this structure, the motor 100 is rapidly detached and mounted without any auxiliary tool, thereby simplifying operations of detaching and mounting a motor and improving the efficiency of replacing a motor.

In this preferred embodiment, the first conductive terminal 11 and the second conductive terminal 201 are conductive contacts. In a variant implementation, the first conductive terminal 11 is a conductive pin, and the second conductive terminal 201 is a conductive socket matching the conductive pin. Alternatively, the first conductive terminal 11 is a conductive socket, and the second conductive terminal 201 is a conductive pin matching the conductive socket. Certainly, the first conductive terminal 11 and the second conductive terminal 201 may further adopt other similar terminal structures. Details are not described herein again. Any structure that adopts a detachable electrical connection shall fall within the protection scope of this embodiment.

In addition, as shown in FIG. 2, the motor fixing structure further includes a connecting member 3, and the connecting member 3 is configured to detachably connect the motor 100 to the aircraft arm 200. The connecting member 3 is passed through the through hole 13 in the motor mount 1 and the mounting hole 203 in the aircraft arm 200 to detachably connect the motor 100 to the aircraft arm 200. In this embodiment, the connecting member 3 is a positioning pin, and may be a screw in other embodiments. In other possible embodiments, the detachable connection between the motor 100 and the aircraft arm 200 may further be a threaded connection, a slidable connection or a buckle connection in which the motor 100 and the aircraft arm 200 are buckled.

It can be understood that both the motor and the motor fixing structure described above can be applied to existing aircrafts.

Finally, it should be noted that the foregoing embodiments are merely used for illustrating rather than limiting the technical solutions in the present application. According to the concept of the present application, the technical features in the foregoing embodiments or in different embodiments may also be combined. Steps may be implemented in any order and there may be many other changes to different aspects of the present application described above. For brevity, the changes are not provided in detail. Although the present application is described in detail according to the foregoing embodiments, a person of ordinary skill in the art should understand that modifications may be made to the technical solutions recorded in the foregoing embodiments or equivalent replacements may be made to some of the technical features therein. These modifications or replacements do not cause the essence of the corresponding technical solutions to depart from the scope of the technical solutions in the embodiments of the present application.

What is claimed is:

1. A motor fixing structure, wherein the motor fixing structure comprises an aircraft arm and a motor detachably connected to the aircraft arm, the motor being provided with a first conductive terminal electrically connected to a lead of the motor, the aircraft arm being provided with a second conductive terminal electrically connected to a control unit of an aircraft, and the first conductive terminal being electrically connected to the second conductive terminal;

wherein the motor is provided with a protruding insertion portion, the first conductive terminal being disposed on the protruding insertion portion, the aircraft arm being provided with an insertion slot configured to accommodate the protruding insertion portion, and the second conductive terminal being disposed inside the insertion slot;

wherein the motor comprises a motor mount and a motor body connected to the motor mount, the protruding insertion portion being disposed on the motor mount;

wherein the motor fixing structure further comprises a connecting member configured to detachably connect the motor to the aircraft arm, the motor mount being provided with a through hole penetrating the motor mount, the aircraft arm being provided with a mounting hole, the connecting member being passed through the through hole and the mounting hole, and the motor being detachably connected to the aircraft arm through the connecting member.

2. The motor fixing structure according to claim 1, wherein the connecting member is a screw or a positioning pin.

3. The motor fixing structure according to claim 1, wherein both the first conductive terminal and the second conductive terminal are conductive contacts; or the first conductive terminal is a conductive pin, and the second conductive terminal is a conductive socket; or the first conductive terminal is a conductive socket, and the second conductive terminal is a conductive pin.

4. An unmanned aerial vehicle, comprising:

a central housing;

an aircraft arm, coupled to the central housing;

an actuator system, mounted on the aircraft arm and comprising a motor and a propeller connected to a rotating shaft of the motor; and a control unit disposed in the central housing;

wherein the motor is detachably connected to the aircraft arm and comprises a first conductive terminal electrically connected to a lead of the motor;

wherein the aircraft arm comprises a second conductive terminal electrically connected to the control unit, the second conductive terminal being electrically connected to the first conductive terminal;

wherein the motor is provided with a protruding insertion portion, the first conductive terminal being disposed on the protruding insertion portion, the aircraft arm being provided with an insertion slot configured to accommodate the protruding insertion portion, and the second conductive terminal being disposed inside the insertion slot;

wherein the motor comprises a motor mount and a motor body connected to the motor mount, the protruding insertion portion being disposed on the motor mount;

wherein the motor further comprises a connecting member configured to detachably connect the motor to the aircraft arm, the motor mount being provided with a through hole penetrating the motor mount, the aircraft arm being provided with a mounting hole, the connecting member being passed through the through hole and the mounting hole, and the motor being detachably connected to the aircraft arm through the connecting member.

5. The unmanned aerial vehicle according to claim 4, wherein the connecting member is a screw or a positioning pin.

6. The unmanned aerial vehicle according to claim 4, wherein both the first conductive terminal and the second conductive terminal are conductive contacts; or
the first conductive terminal is a conductive pin, and the second conductive terminal is a conductive socket; or
the first conductive terminal is a conductive socket, and the second conductive terminal is a conductive pin.

7. The unmanned aerial vehicle according to claim 4, wherein the control unit comprises an ESC and/or a flight control.

* * * * *

UNITED STATES PATENT AND TRADEMARK OFFICE
CERTIFICATE OF CORRECTION

| | |
|---|---|
| PATENT NO. | : 11,309,768 B2 |
| APPLICATION NO. | : 16/567188 |
| DATED | : April 19, 2022 |
| INVENTOR(S) | : Wei Sun et al. |

It is certified that error appears in the above-identified patent and that said Letters Patent is hereby corrected as shown below:

On the Title Page

Item (30) foreign application priority data needs to be added:
(30) Foreign Application Priority Data
Feb. 27, 2017   (CN)    201720182246.4

Signed and Sealed this
Fourteenth Day of June, 2022

Katherine Kelly Vidal
*Director of the United States Patent and Trademark Office*